United States Patent [19]
van der Lely

[11] 4,410,219
[45] * Oct. 18, 1983

[54] TRACKED VEHICLES

[76] Inventor: Cornelis van der Lely, 7, Brüschenrain, Zug, Switzerland

[*] Notice: The portion of the term of this patent subsequent to Aug. 4, 1998 has been disclaimed.

[21] Appl. No.: 210,018

[22] Filed: Nov. 24, 1980

Related U.S. Application Data

[63] Continuation of Ser. No. 895,025, Apr. 10, 1978, Pat. No. 4,281,882.

[30] Foreign Application Priority Data

Apr. 15, 1977 [NL] Netherlands ........................ 7704129
Jun. 24, 1977 [NL] Netherlands ........................ 7707007

[51] Int. Cl.³ ...................... B62D 55/24; B62D 55/28
[52] U.S. Cl. .................................. 305/35 EB; 305/54
[58] Field of Search ............... 305/37, 38, 35 EB, 40, 305/54, 30, 32, 10

[56] References Cited

U.S. PATENT DOCUMENTS 3,378,314  4/1968  Knowles ................. 305/35 EB X
3,747,995  7/1973  Russ, Sr. .................. 305/35 EB
3,883,190  5/1975  Killbane, Jr. ............... 305/54 X

FOREIGN PATENT DOCUMENTS 15362    8/1928  Australia ................. 305/35 EB
1030204  6/1953  France .................... 305/35 EB
1270078  4/1972  United Kingdom .

*Primary Examiner*—David A. Scherbel
*Attorney, Agent, or Firm*—Penrose Lucas Albright

[57] ABSTRACT

A tractor having three sets of twin pneumatic tires mounted on wheels on each side of the tractor, a track being received around three, in one embodiment and two in the other of such pneumatic tires. In each embodiment only the rearmost set of wheels is powered directly from an axle rather than via the track. The track is a belt of flexible material which in the first embodiment has a plurality of traction members secured thereto by bolts extending through the belt and secured on the inner side by a strip opposite the traction members, such strip having a V-shaped portion which is received between the twin tires to retain the track in place. Each such traction member includes a part flush to the belt through which the bolts are received, a further part extending from the first part outwardly and normally to the belt and a ground engaging part extending from the second part in a direction parallel to the belt. The traction member in cross-section thus may alternately appear as an inverted U with outwardly extending flanges or as a "C" with square sides or as an inverted "T" or the like whereby, in other embodiments, the ground engaging portion of the traction member has at least one flange extending away from the second part of the traction member. In operation, the traction members tend to become biased when propelling the tractor under tension so their ground engaging parts are inclined downwardly relative to the ground from the tractor's direction of travel.

14 Claims, 18 Drawing Figures

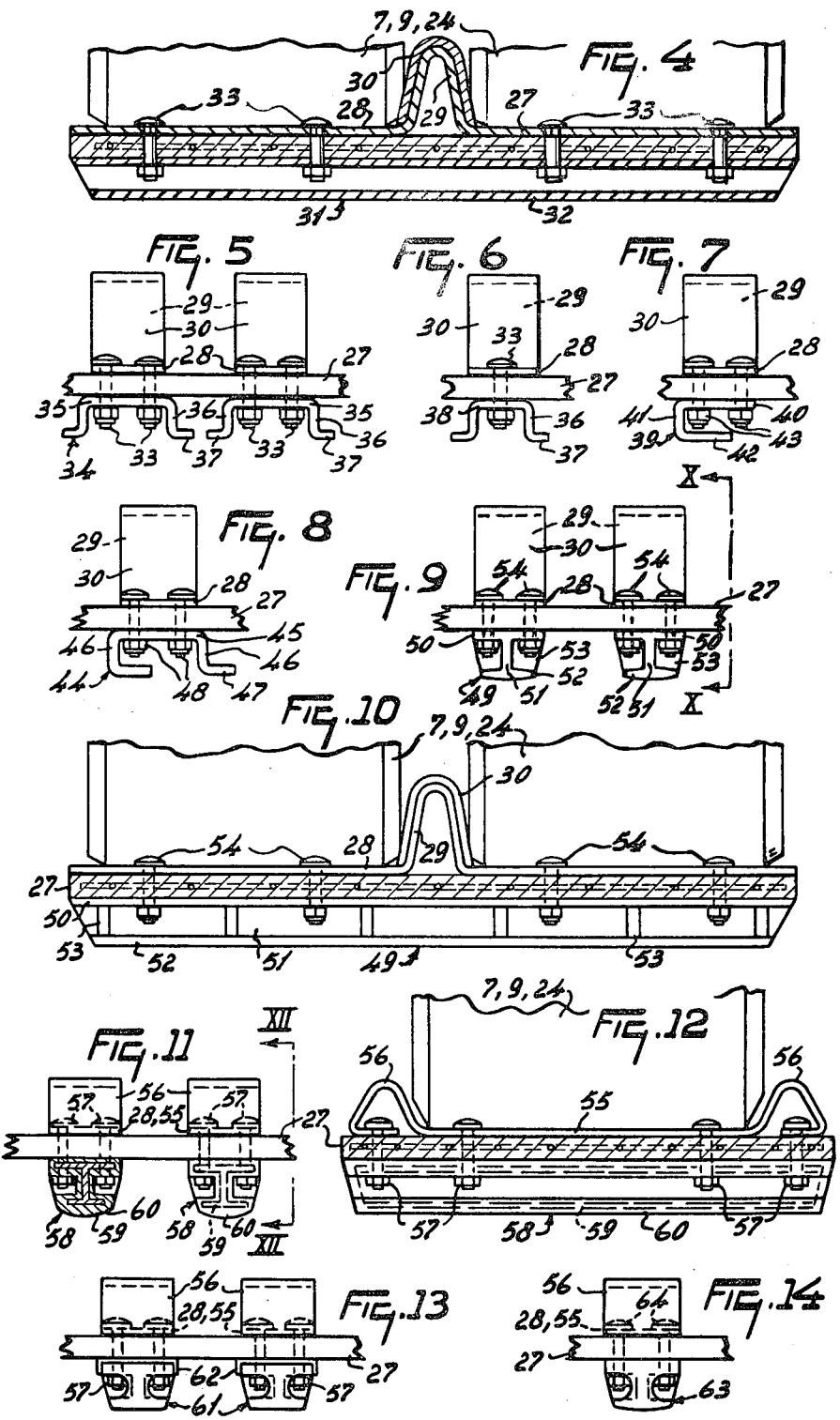

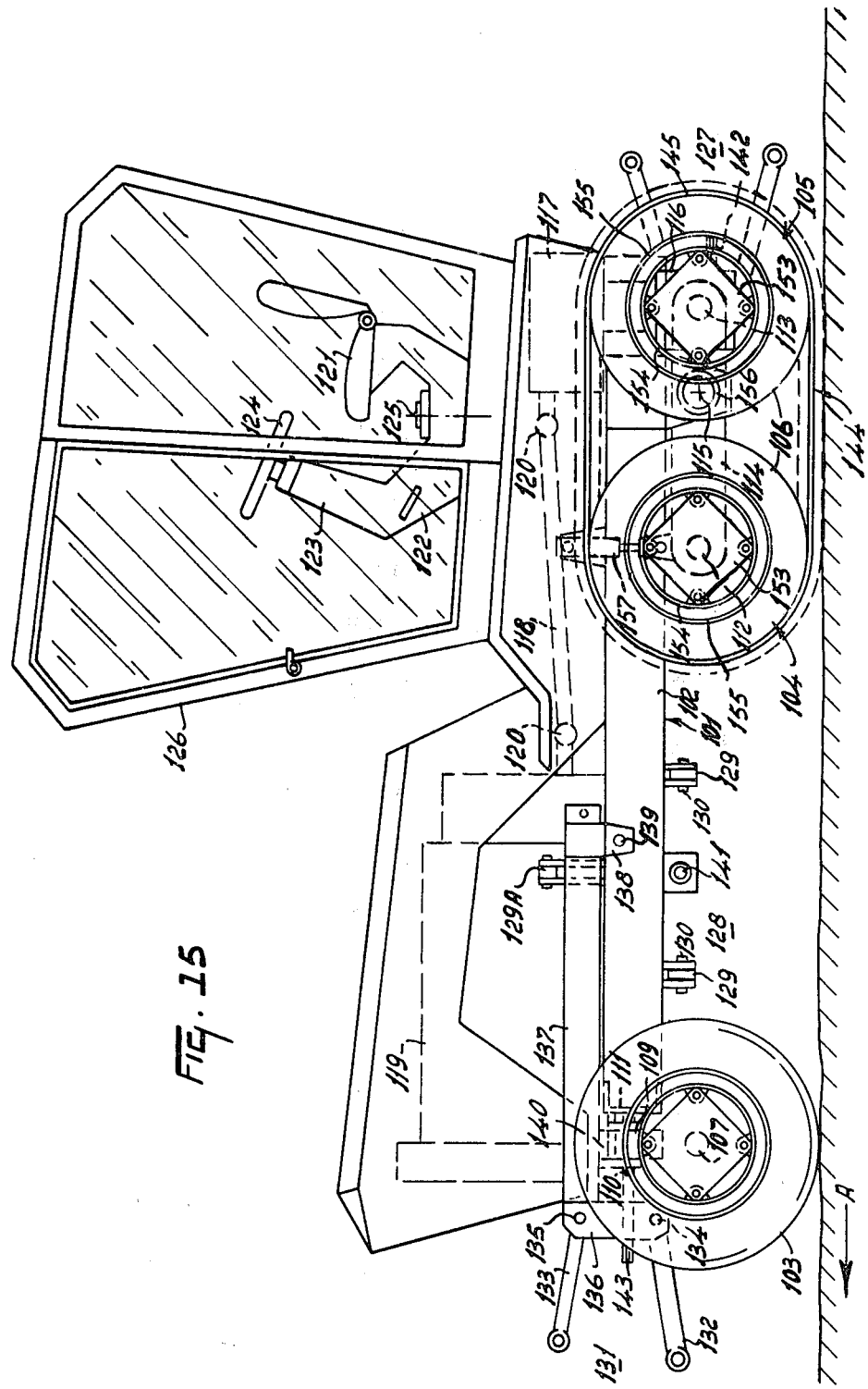

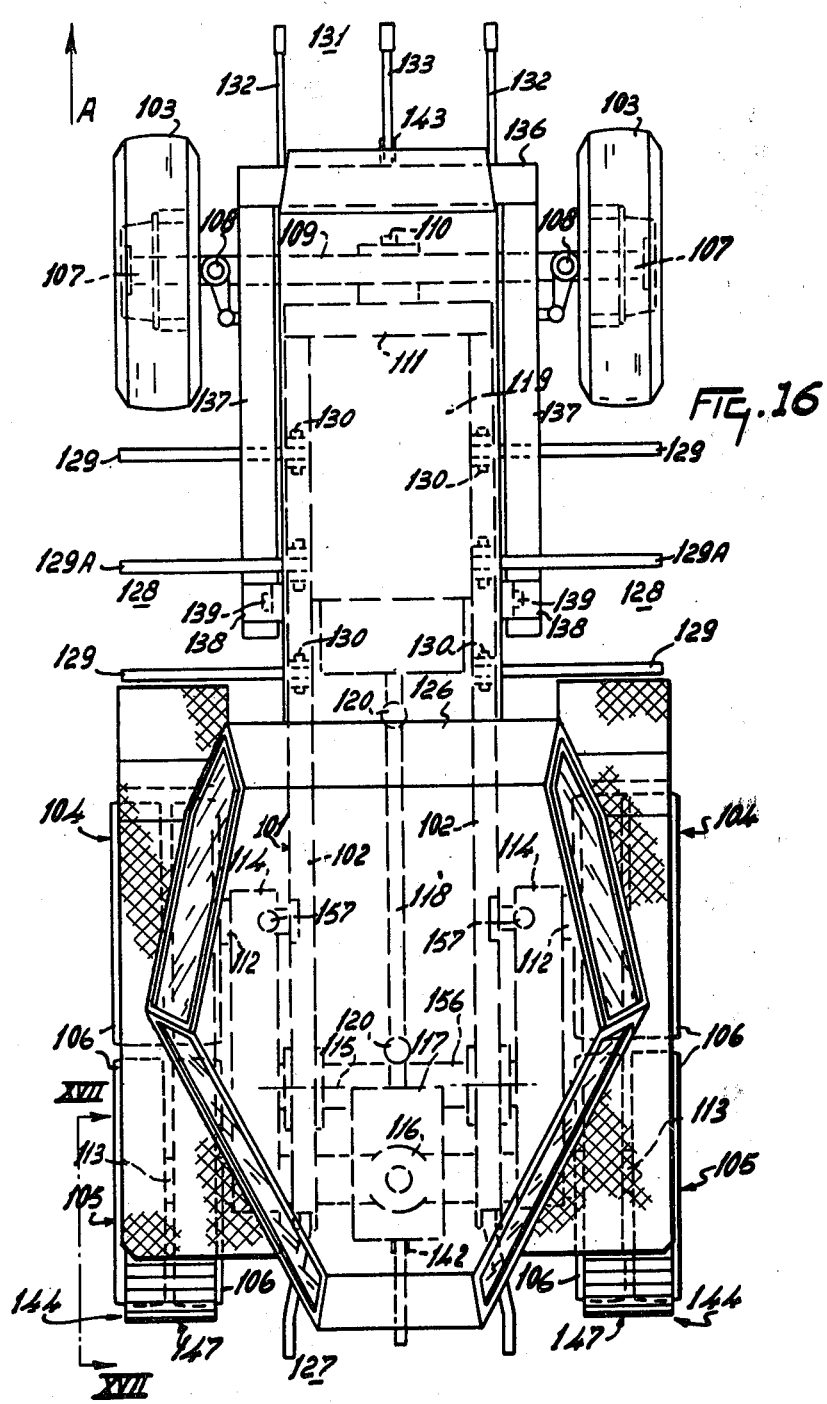

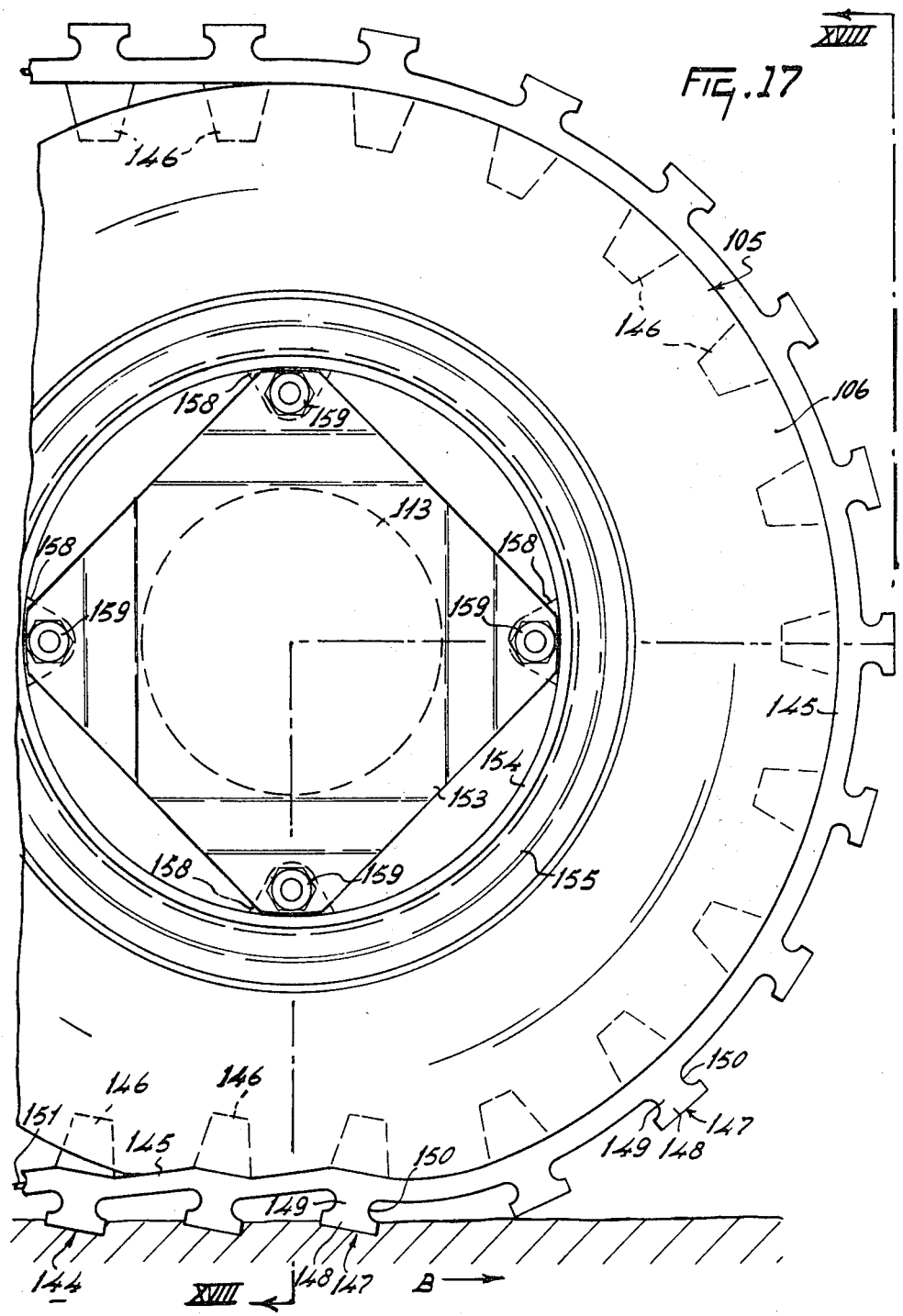

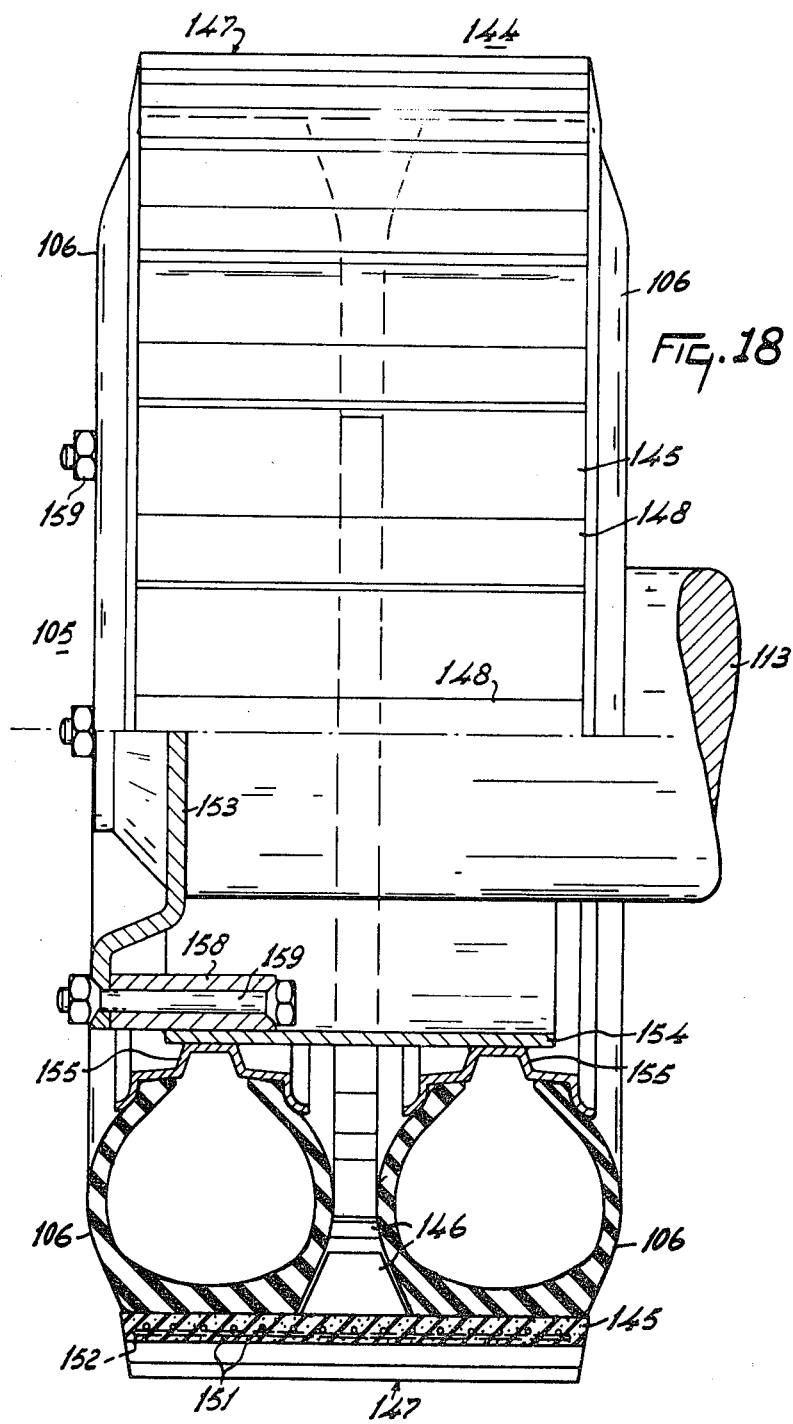

TRACKED VEHICLES

RELATED APPLICATION

This is a continuation of Ser. No. 895,025, filed Apr. 10, 1978, now U.S. Pat. No. 4,281,882, issued Aug. 4, 1981.

SUMMARY OF THE INVENTION

The invention relates vehicles included in the group which comprises tractors, motorcars, soil cultivating machines, trucks, wagons and the like, wherein such vehicles comprise at least one track arranged around the vehicles' ground wheels.

According to one aspect of the invention the track comprises a belt of flexible material and has a plurality of profiles, ridges or the like which are directed forwardly with respect to the direction of rotation of the track for forward travel of the vehicle and connecting means for connecting implements to the vehicle.

For a better understanding of the invention, and to show how the same may be carried into effect, reference will be made, by way of example, to the accompanying drawings, in which:

BRIEF DESCRIPTION OF THE DRAWINGS

FIG. 4 is a section taken on the line IV—IV in FIG. 3, FIGS. 5 to 9 show alternative embodiments as seen in the direction of the arrow III in FIG. 2, FIG. 10 is a section taken on the line X—X in FIG. 9, FIG. 11 which is partly in section, illustrates an embodiment of an endless tread track that is suitable for a plurality of vehicle wheels, again as seen in the direction of the arrow III in FIG. 2, FIG. 12 is a section taken on the line XII—XII in FIG. 11, FIGS. 13 and 14 show further alternative embodiments of the endless tread track, FIG. 15 is a side elevation of a further tractor in accordance with the invention, FIG. 16 is a plan view of the tractor of FIG. 15, FIG. 17 is a side elevation, to an enlarged scale, of part of the rear of the tractor as seen in the direction of the arrows XVII—XVII in FIG. 16, and FIG. 18 is a part sectional elevation taken on the line XVIII—XVIII in FIG. 17.

BRIEF DESCRIPTION OF THE PREFERRED EMBODIMENTS

Figure 1:
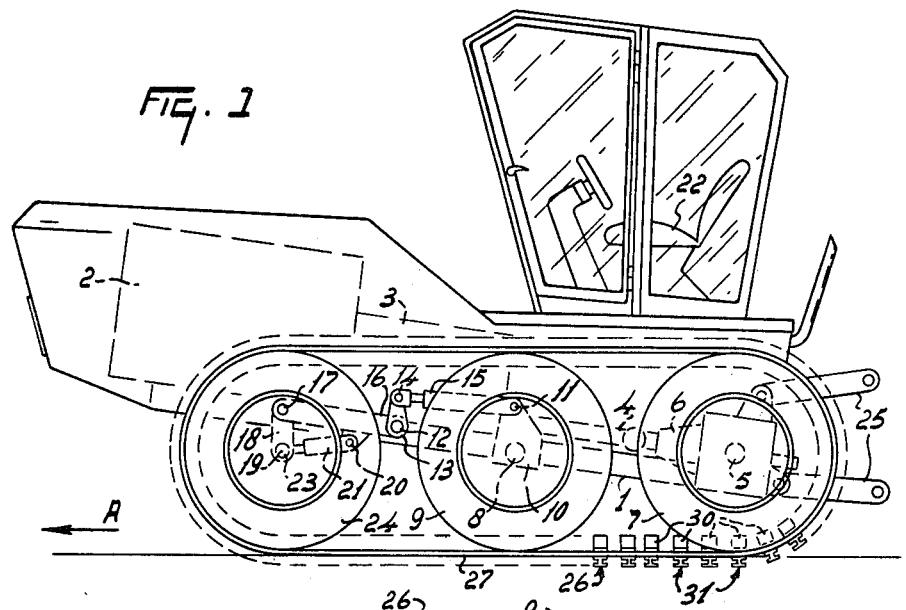
FIG. 1 is a side elevation of a tractor to which the invention is applied.
Figure 2:
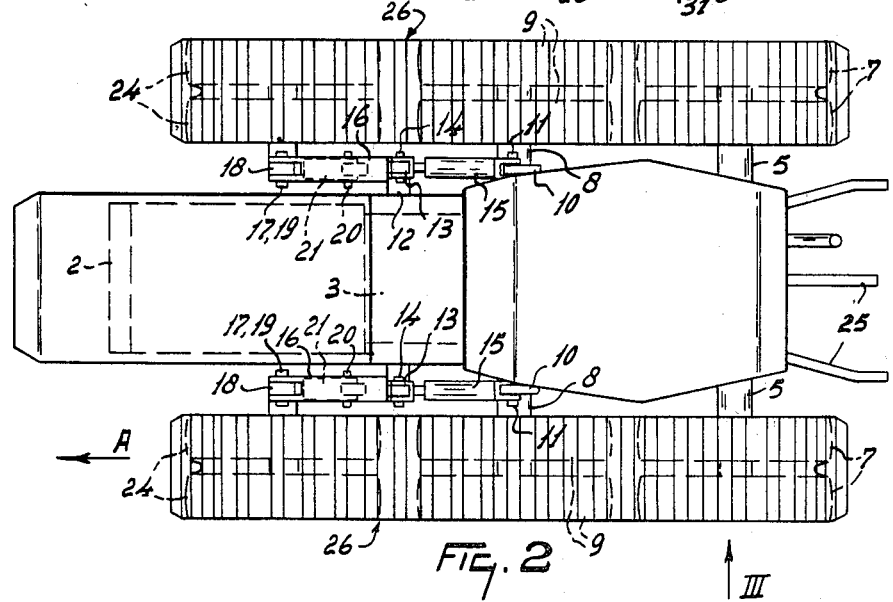
FIG. 2 is a plan view of the tractor shown in FIG. 1.

FIGS. 1 and 2 comprise a frame 1 to which a driving engine 2 is secured at the front, said engine 2 driving, by means of a gear transmission 3 and an auxiliary shaft 4, a rear axle 5 through a differential 6. The rear axle 5 has on each side of the tractor two rear wheels 7 located side by side and being provided with tires. The diameters of the rear wheels 7 are equal to one another. The tractor is furthermore provided with a central axle 8 located in front of the rear axle 5 and parallel to the latter. The central axle 8 is rigidly secured in place with respect to the tractor frame 1. The central axle 8 also has, on each side of the tractor two tired central wheels 9 arranged side by side and having diameters equal to those of the rear wheels 7. Considered in the direction A, the rear wheels 7 are in line with and behind the wheels 9.

At the area of the central axle 8, a support 10 is provided on either side of the tractor on the frame 1, said support 10 extending upwardly from the axle 8 and supporting a pivotal shaft 11 at an area located perpendicularly above the axle 8, the center line of said shaft 11 being horizontal and perpendicular to the direction A. On each side of the tractor, the frame 1 has fastened to it a pivotal shaft 12, which also extends horizontally and perpendicular to the direction A. In the side view of FIG. 1, the pivotal shaft 12 is located just in front of the foremost points of the central wheels 9. With each pivotal shaft 12 is rigidly connected a short arm 13 extending approximately vertically upwards from the pivotal shaft 12 in the normal operational state. At the end remote from the pivotal shaft 12, each arm 13 has a pivotal shaft 14 extending parallel to the pivotal shaft 11. About the pivotal shaft 14 is pivotable the piston rod of a hydraulic cylinder 15, the cylinder itself being pivotable about the shaft 11.

Each pivotal shaft 12 has also rigidly secured to it an arm 16 which extends forwardly and slightly upwardly from the pivotal shaft 12, considered in the direction of travel A. The front ends of the two arms 16, located one on each side of the tractor frame, are each provided with a pivotal shaft 17 extending horizontally perpendicular to the direction A. About each pivotal shaft 17 is pivotable an arm 18 which extends approximately vertically downwards in the normal operational state. The lower end of each arm 18 is provided with a horizontal pivotal shaft 19 extending perpendicular to the direction A. At an area located between the shafts 12 and 17, the bottom of each arm 16 is provided with a pivotal shaft 20, which is parallel to the corresponding pivotal shaft 19. To each pivotal shaft 19 is pivoted the piston rod of a corresponding hydraulic cylinder 21, the cylinder 21 itself being pivotable about the respective pivotal shaft 20. The distance between he center lines of the shafts 12 and 17 is about four times the distance between the shafts 12 and 14 and about three times the distance between the shafts 17 and 19.

The hydraulic cylinders 15 and 21 communicate with the hydraulic system of the tractor and can be actuated from a driver seat 22 located, viewed from a side (FIG. 1) approximately above the region between the axles 5 and 8. Each of the parts of the hydraulic system communicating with the hydraulic cylinders 15 and 21 may include a hydro-pneumatic or other pressure accumulator.

To the lower end of each arm 18 is furthermore secured a front wheel axle 23, the center lines of the front axles 23 and of the pivotal shafts 19 being coincident. These two shafts may be integral with one another. Front wheels 24 with tires are freely rotatable about the front axles 23. The diameters of all the front wheels 24 are equal to those of all the wheels 7 and 9. The central wheels 9 are freely rotatable about the central axles 8.

The tractor shown in FIGS. 1 and 2 comprises furthermore a three-point lift 25 fastened to the tractor near the driven rear axle 5. The weight of the driving engine 2 and of the gear box 3 bears principally on the front wheels 24.

The front wheels 24 also comprise, on each side of the tractor, two tired wheels arranged side by side so that, considered in the direction A, the front wheels 24, the central wheels 9, and the rear wheels 7 are in line one behind the other.

About each of the three pairs of wheels 7, 9, 24 on each side of the tractor is passed an endless tread track 26, the width of which approximately corresponds with the overall width of two neighboring tired wheels. The width of the track is about fifty centimeters (19⅝ inches).

Figure 3:
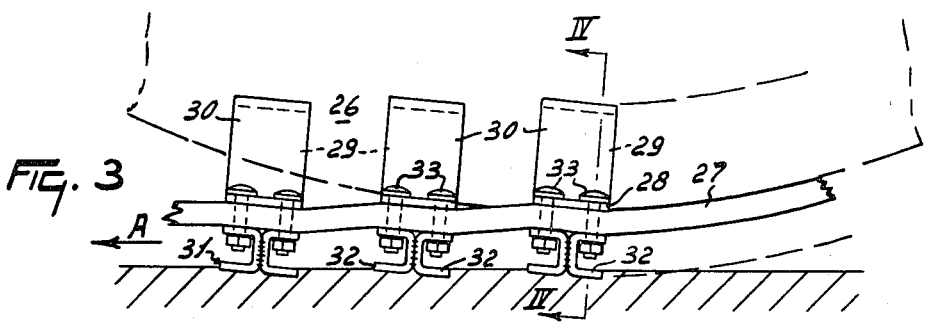
FIG. 3 is a side elevation to an enlarged scale, as seen in the direction of an arrow III in FIG. 2 and shows part of an endless tread track of the tractor in contact with the ground.

Track 26 comprises an endless belt 27 of synthetic resin or rubber-like material or both which may be reinforced by nylon or canvas liners or by steel wiring or a combination thereof. The flexible endless belt 27 covers the whole width of track 26. From FIGS. 3 and 4 it is apparent that the flexible belt 27 is provided on its inner surface in the installed state with a large number of equidistant metal strips 28 covering the width of the belt. In the sectional view of FIG. 4, each strip 28 joins the surface of the flexible belt 27 throughout the width of the outer surface of the tire at the areas where the outer surfaces of the tires of the wheels come into contact with track 26. Midway across the width of each strip 28, an inward extension 29 is formed in the shape of an inverted V and is integral with the flat parts of the strip 28 on either side. The width of each extension 29 is such that it fits in the space between the belts of each pair of wheels fastened to one axle. As seen in FIGS. 3, 5 and 9, the length of said extension 29 is the same as the distance between successive extensions 29. On the inner surface, that is to say, on the side facing the wheel axles, each extension 29 has a rubber coating 30 which is secured thereto by vulcanization.

On the outer surface of the flexible belt 27, that is to say, on the side remote from the wheel axles in the installed state, a number of profiles 31 are provided, the number being equal to the number of strips 28, and considered in the direction of length of the belt 27, each profile 31 is fastened at an area on the belt 27 where a strip 28 is located.

Each profile 31 comprises two U-shaped rolled profiles 32, the webs of which are arranged back-to-back where they may be welded to one another, whereas the flanges extend forwardly and rearwardly, respectively, relative to the direction A. The profile 31 covers the whole width of the belt 27. The two flanges which engage the bottom of the belt 27 have bores. At corresponding areas the belt 27 and also the opposite strips 28 also have bores for receiving bolts 33 so that heads of the bolts are located on the tops of the strips 28, whereas the co-operating nuts are located between the flanges of the profiles 32. The profiles 32 are thus each fastened by means of two rows of the bolts 33 which rows are spaced apart and located side by side, viewed in side elevation, together with the associated strips 28, to the flexible belt 27. The width of the flange of each of the profiles 32 is approximately equal to half the width of the associated strip 28 so that the width of the ground-contacting flat bottom of each profile 31 is substantially equal to the width of one of the strips 28. The distance between two profiles 31, and between two strips 28 measured lengthwise along the belt 27, is substantially equal to the width of one end of the profiles 31 and one of the strips 28.

In the embodiment shown in FIG. 5, the belt 27 is provided on the surface remote from the wheels is provided with gutter-shaped or channel-section profiles 34 each consisting of a single length of rolled steel covering again the whole width of the belt 27. Each profile 34 has a web 35 which fully engages the belt 27 and which has a width equal to the width of the opposite strip 28 or a width slightly greater than the latter. The two longitudinal edges of the web 35 join limbs 36 which extend perpendicular to the web 35 and to the belt 27. The end edges of the limbs 36 that are remote from the web 35 terminate in flanges 37 which are parallel to the web 35, one flange extending to the front from the limb 36 concerned, considered in the direction A and the other flange 37 extending to the rear. The profile 34 is again secured to the belt 27 by two rows of the bolts 33 and to the strips 28, whereas the nuts screwed onto said bolts are located between the limbs 36. The neighboring ends of the bolts 33 are located at a distance from the outer edges of the limbs 36. The width of the limbs 36 and of the flanges 37 are approximately equal to half the width of the web 35. For certain purposes it is advantageous to use a narrower profile, in which case the width of the web is approximately equal to the width of the associated limbs 36 and of the associated flanges 37, as is shown in FIG. 6. In this embodiment the profile 38 may be secured by only one row of bolts 33 to the belt 27 and to the strips 28, in which case the profile has a greater movability.

In the embodiment shown in FIG. 7, the profile 39 comprises a web 40, which fully engages the belt 27 and which has a width approximately equal to, or slightly greater than, the width of the strip 28 on the other side of the belt 27. Considered in the direction A, the front edge of the web 40 has a limb 41 at right angles to the web 40 and to the belt 27 so as to extend away from the belt 27. The width of the limb 41 is substantially equal to half the width of the web 40. The limb 41 joins a flange 42 extending parallel to the web 40 and to the belt 27 and away from the limb 41 in a direction opposite the direction A or, on other words, extending from the limb 41 in the direction of movement or rotation of the region of track 26 located on the ground with respect to the frame. The width of the flange 42 is about three quarters of the width of the web 40. The profile 39 is secured by two adjacent rows of bolts 43 to the belt 27 and to the strip 28. The nuts screwed onto the bolts 43 are located in the space between the web 40 and the flange 42.

In the embodiment shown in FIG. 8, the side of the belt 27, that is remote from the wheels is provided with a profile 44 having a web 45 which engages the belt 27 and which has a width approximately equal to, or slightly greater than, the width of the strip 28. The two end edges of the web 45 merge into limbs 46 which are at right angles to the web 45 and also to the belt 27, while the edges of the two limbs that are remote from the web 45 have flanges 47, which, in contrast to the embodiment shown in FIG. 5, both project from the associated limbs 46 opposite to the direction A and in the direction of rotation with respect to the frame. The profile 44 is secured to the flexible belt 27 and to the associated strip 28 by two rows of bolts 48, whereas the nuts screwed onto said bolts 48 and engaging the web 45 are located inside the profile 44 as in the preceding embodiments.

The profiles shown in the preceding embodiments are all rolled profiles. FIGS. 9 and 10, however, show profiles 49 of forged material. The profiles 49 have essentially an I-shaped cross-section, a top flange 50 having a width approximately equal to the width of the strip 28 located on the other side of the belt 27. A web 51 joining the center of the flange 50 is at right angles to that flange 50 and to the belt 27 itself and is provided, at the end remote from the flange 50, with a flange 52 extending on either side, the outer surface of which flange 52 is slightly cylindrically curved (see FIG. 9). The flange 52 is directly supported by means of a number of lateral partitions 53 on either side of the web 51 on the flange 50 and on the web 51. The lateral partitions 53 are at right angles to the direction of the length of the profile 49 and are spaced apart by equal distances. The flanges 52 and 50, the web 51 and the lateral partitions 53 are forged integrally from a single piece of material. The profiles 49 are preferably treated thermally so that at least their flanges 52 are hardened. The profiles 49 are secured by two rows of bolts 54 to the belt 27 and to the associated strips 28. The nuts of said bolts are covered on the lower side as seen in FIGS. 9 and 10 by the associated flanges 52.

FIGS. 11 and 12 shown an embodiment in which track 26 is suitable for a vehicle having only one tired wheel at each end of each axle. The surface of the flexible belt 27 facing the wheels is provided for this case with a large number of strips 55 which engage the surface of the flexible belt facing the wheels over a width equal to the width of the tires. At both ends of each strip 55, an extension 56 is provided in the form of an inverted V as shown in FIG. 12 so that the sloping surface of the extension facing the wheel fits one side of each co-operating tire. The outer end of each extension 56 is bent back towards the center of the belt and is in contact with the surface of the belt 27. These bent-back parts of the extensions 56, as well as the flat central part of the strip 55, are secured by bolts 57 to the belt 27 and to a profile 58 on the other side of the belt 27. Each profile 58 comprises a rolled steel I-profile 59 which is vulcanized to, and completely embedded in, a layer 60 of flexible material, for example, rubber. The nuts on the two rows of bolts 57 located between the flanges of the profiles 59 bear on the hard rubber layer 60 coating the flanges of the rolled profile 59 located near the belt 27. The profile 58 may also be employed in the preceding embodiments.

In the embodiment shown in FIG. 13 for an endless track suitable for use on a row of single wheels or on a row of double wheels, the surface of the flexible belt 27 remote from the wheels is provided with a profile 61 having essentially an I-shaped cross-section and being made from a synthetic resin or a kind of rubber preferably provided with liners. The flange of each profile 61 facing the flexible belt 27 is embedded in a gutter-shaped rolled-steel profile 62 comprising the boundary face of the flange of the profile 61 facing the belt 27 as well as the two sides of said flange, the profile 62 being secured by vulcanization to the synthetic plastics or rubber profile 61.

In the embodiment shown in FIG. 14, the surface of the belt 27 remote from the wheels is provided with a profile 63 also of synthetic resin or a rubberlike material, the profile again having essentially an I-shaped cross-section. As in the preceding embodiment the profile 62 is directly secured to the belt 27 by two rows of bolts 64. The outer boundary face of the flange remote from the belt 27 is, in this embodiment, slightly convex as is shown in FIG. 14.

When the vehicle driver energizes the two hydraulic cylinders 21 so that the front axles 23 move towards the pivotal shafts 20, the arms 18 thus being turned about the pivotal shafts 17, the distance between the front axle and the further wheel axles 5, 8 is reduced so that the caterpillar track 26 can be passed manually around the three sets of wheels without the need for further means. It may be advisable in this case to provide each endless tread track with one or more joints which are closed after the belt has been arranged around the wheels. Subsequently, the hydraullic cylinders 21 are again energized so that the lower ends of the arms 18 turn forwardly to tension tracks 26. During operation, the pressure in the hydraulic cylinders 21 is maintained at a predetermined value in known manner.

The rear wheels 7 are driven by the engine 2 through the gear box 3, the auxiliary shaft 4 and the differential 6 while the lower run of each track 26 moves, with respect to the frame 1, in a direction opposite the direction of forward travel A. The central wheels 9 and the front wheels 24 will then rotate freely. When the lower part of one of the endless tracks runs across local unevennesses, so that this part of the track is displaced upwardly between two sets of the wheels, the front axle 23 can move resiliently towards the pivotal shaft 20 if the hydraulic system of the cylinders 21 includes a pressure accumulator so that the tension of track 26 cannot reach an undesirably high value. The moment exerted by the rear wheels 7 on track 26 is transmitted by the extensions 29 with the rubber coating 30, which are jammed between the neighbouring sides of the pairs of tires and penetrate to some extent into the tire treads and by the grip of the tread of the curved outer surface of each tire on a large number of the strips 28, which are then in contact with the tires of the rear wheels 7. The distances between two adjacent strips 28 and the associated extensions 29 are, of course, chosen so that the number of strips and extensions constantly in contact with the rear wheels 7 is sufficiently large for transmitting the required tractive moment to tracks 26. For negotiating bends, a set of rear wheels on one side of the tractor is not driven or is blocked in known manner, whereas the set of rear wheels 7 on the other side of the tractor is driven. In order to be able to reduce, if desired, the surface contact of one of the caterpillar tracks when driving through a bend, one of the hydraulic cylinders 15 is energized so that the arm 16 is turned upwards with respect to the frame 1 as a result of which one of the front wheels 24 is lifted from the ground. The tension of track 26 is maintained by preserving the pressure in the corresponding cylinder 21 in known manner at a constant value or by means of a pressure accumulator. By simultaneous energization of the two cylinders 15, the two front wheels 24 can both be moved upwards or downwards with respect to the further part of the vehicle owing to the angular displacement of the arms 16, if the inclination of the field to be covered abruptly varies, for example, at the edge of a slope.

The hydraulic system communicating with the two cylinders 15 may also include a pressure accumulator in order to dispose the front axles in a resilient or flexible manner having regard to the tension of tracks 26.

In the embodiments shown in FIGS. 3 and 4; in which its row of extensions 29 fixes each track 26 in a lateral direction with respect to the wheels the flange of one of the two profiles 32 in each profile 31 extending rearwardly of the direction A and forwardly in the direction of rotation of the lower run of track 26 with respect to the frame is urged rearwardly into the soil owing to the driving moment. Since the flange of the rearmost profile 32 located at a distance beneath the flexible belt 27 and extending in said direction is exposed to a forwardly directed force, a moment is exerted on the flexible belt 27 which is such that the whole profile 31 tilts slightly. In FIG. 3 the angle of downward tilt relative to the ground is about five degrees.

As a result, the grip of each profile 31 on the soil is materially enhanced owing to the resultant resistance of the profile. The flexible belt 27 will then assume the position shown diagrammatically in FIG. 3. Thus, also, the grip of the strips 28 and of the extensions 29 on the tires is increased. This phenomenon occurs similarly in all of the other embodiments. Owing to the deformation of the belt 27, the neighboring flanges 37 of two adjacent profiles 34 (FIG. 5) will turn relative to one another so that these flanges produce a sawtooth-like formation which increases the grip on the ground. In the embodiment shown in FIG. 6, the profiles are secured, in contrast to the other embodiments, by only one row of the bolts 33 so that a comparatively large tilting movement due to the tractive force can occur resulting in a comparatively strong grip on the ground. In the embodiments of FIGS. 7 and 8, apart from said tilting, a larger ground surface contact is obtained by the relatively broad flanges 42 and 47. The eccentric disposition of the flange 42 (FIG. 7) with respect to the contact surface on the belt 27 can increase the tilting movement initiated by the tractive force. In the construction shown in FIG. 8, the two flanges 47 of the profile 44 will both tilt in the event of a high tractive force so that the grip on the ground is appreciably enhanced. The flat bottoms of the profiles in the preceding embodiments ensure a low contact pressure when the profiles have not tilted, which will be the case when a low tractive force is sufficient, for example, on bituminous roads, while damage to such roads is avoided.

In the embodiments of FIGS. 9 and 10, the partitions 53 prevent lateral emergence of soft or other weak soil from the profiles 49 when the latter have tilted and have penetrated into the ground in a scooping position. The convex outer surfaces of the flanges 52 are conductive to the tilting movement of the profiles when contacting the ground and produce a further tilting when the driven wheel approaches the profile 49. The profiles 58 of the embodiment of FIGS. 11 and 12 have a similar effect to those of the preceding embodiments. However, the envelopment of the rolled profiles 59 in the flexible material layer 60 improves on the one hand, the flexible joint between the profile 59 and the belt 27 and reduces on the other hand, the risk of damage to the road surfaces on bituminous roads. The curved bottom of the flexible envelope layer 60 improves, on the one hand, the tilting movement of the profile when a high tractive force is exerted, and ensures, on the other hand, a low contact pressure on asphalt roads with a low tractive force, since the flexible material layer 60 will deform so that a flat bottom side of the flexible envelope will effectively be formed. This also applies to the embodiment of FIG. 14, in which the whole profile 63 consists of flexible material so that a broad contact surface is obtained on hard roads. A similar effect is obtained by the profile 61 of FIG. 13 which consists entirely of flexible material and which already has a flat bottom, the profile 62 preventing an excessive deformation of the profile 61 near the belt 27 so that the fit of the bolt joint is maintained under all conditions.

It should be noted that the vehicle shown in FIGS. 1 and 2 may, of course, also be used without the tracks 26. In both cases an advantageous distribution of the weight of the driving engine 2, of the gear box 3 and that of the implement or tool to be attached to the lift 25 among the three sets of wheels 7, 9, 24 is obtained so that a uniform distribution of the surface pressure among the three sets of wheels and along the length of tracks 26 with the ground is ensured.

In a further embodiment the vehicle shown in FIG. 15 comprises a frame 101 having two substantially horizontal and relatively parallel frame beams 102, the frame 101 being supported by steerable front wheels 103 and by two pairs of rear wheels 104 and 105 arranged one behind the other on either side of the vehicle. The two foremost rear wheels 104 and the hindmost rear wheels 105 are in line behind the former considered in the direction A and are provided with tires 106 having conventional profiles. The front wheels 103 are also provided with tires. The diameter of the foremost rear wheels 104 is substantially equal to that of the hindmost rear wheels 105. In this embodiment, the diameter of the front wheels 103 is equal to that of the rear wheels 104 and 105 but the diameter of the front wheels 103 may be larger or smaller than that of the rear wheels. Axles 107 of the front wheels 103 are fastened through steerable pivot pins or king pins 108 to a front axle beam 109 extending perpendicular to the direction A, the beam 109 being freely pivotable in a vertical plane of substantial symmetry of the tractor on a horizontal pivot shaft 110 extending in the direction A, and being journalled in a support fastened to a transverse beam 111 which interconnects the front ends of the longitudinal frame beams 102. Viewed from one side (FIG. 15) the pivotal shaft 110 is located substantially midway between the top and bottom of the transverse beam 111. Wheel axles 112 of the foremost rear wheels 104 and wheel axles 113 of the hindmost rear wheels 105 are supported on one side of the tractor, in a beam 114 extending parallel to the direction A and being located alongside the corresponding frame beam 102. The supporting beam 114 is freely pivotable about a shaft 115 which extends horizontally perpendicular to the direction A and which is located beneath the bottoms of the frame beams 102. The two supporting beams 114, together with the rear wheels coupled thereto, are freely pivotable about the shaft 115. The pivotal shaft 115 is located on one side of the aforementioned vertical plane of substantial symmetry between the wheel axles 112 and 113, that is to say, between said plane and the corresponding wheel axle 113. The foremost rear wheels 104 are freely rotatable on the axles 112. The two wheel axles 113 are extended in the space between the two supporting beams 114 and are coupled together by a differential gear 116 which has an upwardly extending input shaft coupled with the output shaft of a torque converter 117, the latter being pivotable to a limited extent relative to the frame 101 of the tractor and being connected to said frame. The torque converter 117 is located, viewed in side elevation wholly or partly above the hindmost rear wheels 105. The connection between the output shaft of the torque converter 117 and the input shaft of the differential 116 is telescopic in view of potential movements of the supporting beams 114. The torque converter 117 may comprise two pairs of adjustable wheel discs, said pairs being interconnected by a chain so that, by relative adjustment of each of the pairs of wheel discs, a continuously variable transmission can be obtained. The torque converter 117 comprises an input shaft which can be driven through an auxiliary shaft 118 by the tractor engine 119, the auxiliary shaft 118 preferably being telescopic and being provided with two universal joints 120 so that relative movements of the torque converter 117 and the tractor engine 119 are possible.

The front wheels 103 are steerable from a driver seat 121, which is located, as seen in FIG. 15 at a distance above the top points of the rear wheels 104 and 105 and, viewed in plan (FIG. 16) in the position shown in FIG. 15 between the wheel axles 112 and 113. The driver seat 121 is fastened to a console 122, to which is fastened, moreover, a column 123 provided with a steering wheel 124 and all further steering and control-members. The assembly of the seat 121, the console 122, the column 123, the steering wheel 124 and all further steering and control-members is pivotable as a whole about a substantially vertical pivotal shaft 125 located in the vertical plane of substantial symmetry of the tractor. The assembly can be fixed in the positions differing by 180° around the axis of said shaft 125 so that the front of the seat 121 faces in the direction of forward travel A or in the opposite direction. The driver seat 121 is surrounded by a cabin 126 extending, as seen in FIG. 15 above the rear wheels 104 and 105.

The rear of the tractor shown in FIG. 15 has a three-point lift 127 which can be hydraulically energized from the driver seat 121. Viewed in FIG. 15 those parts of the two frame beams 102 which are located between the rear regions of the front wheels 103 and the front regions of the rear wheels 104 are provided on either side of the tractor with a lifting device 128, the lower lifting arms 129 of which are connected to the bottoms of the frame beams 102 so as to be pivotable about horizontal shafts 130 extending in the direction A by hydraulic agency from the driver seat 121. The top arm 129A of the lift 128 bears on the top of the adjacent frame beam 102.

A front three-point lift 131 comprises lower lifting arms 132 and a top lifting arm 133 arranged to pivot about substantially horizontal shafts 134 and 135 respectively, said shafts extending perpendicular to the direction A and being journalled in a support 136 located at a small distance in front of the front axle beam 109. The lifting device 131 can also be actuated from the driver seat 121 by a hydraulic agency. The support 136 is fastened in position by two arms 137 extending away from the support 136 to the rear. Each of the arms 137 is located, as seen in FIG. 15, at a small distance above the top of the adjacent frame beam 102 and, as seen in FIG. 16, on the outer side of the corresponding frame beam 102. Near the rearmost ends of the arms 137, which are located, viewed in plan, about midway across the space between the wheel axles 107 and 112, said arms are provided with fastening lugs 138 holding horizontal pivotal shafts 139 extending perpendicular to the direction A. Each of the pivotal shafts 139 is fastened to the side of the adjacent frame beam 102. The joint between each pivotal shaft 139 and the associated lug 138 is preferably movable, for example, by means of a ball hinge arranged in a comparatively large rubber support socket in the lug 138. At a short distance behind the support 136, the bottom of each arm 137 bears on the top of the front axle beam 109, and, between the bottom of each arm 137 and the top of the front axle beam 109, there may be arranged a rubber support 140. An undesirable upward displacement of either arm 137 with respect to the front axle beam 109 is prevented by a stop (not shown) formed, for example, by a bolt passed vertically through the arm 137 and fastened in the front axle beam 109, said bolt having a stop plate bearing on the top of the arm 137. In this way the lift 131 can follow the movements of the front axle beam 109 so that a machine or a total attached to the lift 131 can match the unevennesses of the ground independently of the movements of the tractor frame 101. The tractor frame 101 generally follows the movements of the rear wheels which are located, however, at a relatively large distance behind the machine or tool attached to the foremost lift 131. The disposition of the lift 131 is, therefore, preferably such that the machine or tool attached to said lift is located at a relatively short distance from the front wheels 103. Since the front of the tractor frame has, in general, a light construction, this front is advantageously hardly loaded by the lift 131 because the lift directly bears on the front axle beam 109 and otherwise at a place on the tractor frame 101 located at a distance behind the front wheels 103, while the pivotal shafts 139 exert, in general, upwardly extending forces on the frame beams 102. Therefore, the lift 131 and its connections may be the same as are provided on standard tractors.

Near each lifting device 128, a power take-off shaft 141 extends substantially horizontally perpendicular to the direction A and is driven at the engine speed. Near the rear lift 127, and also near the front lift 131, further power take-off shafts 142 and 143 are provided.

From FIGS. 17 and 18 it will be apparent that the pairs of rear wheels 104 and 105 on either side of the tractor are surrounded by an endless tread track 144 passing around the treads of the tires 106 of the two pairs of wheels 104 and 105. Each track 144 comprises an endless belt 145, the width of which corresponds substantially with the width of the adjacent wheels 104 or 105. Each belt 145 is provided on the inner surface facing the wheels 104 and 105 with a large number of equidistant teeth or cams 146 in a row parallel to the direction of length of the belt 145. Considered in the direction of length of each belt (FIG. 18) each tooth or cam 146 is disposed symmetrically to a vertical plane of symmetry of that belt 145. Each tooth or cam 146 has the shape of a truncated pyramid, the side faces of which converge away from the belt 145. Considered in the direction of length of the belt 145 (FIG. 18) the dimensions of each cam 146 are such that it fits between the side faces adjacent the treads of the two tires 106 on either side of the cam. A cam 146 engaging the wheels 104 and 105 is thus located between the outer parts of two neighboring tires and its shape is such that it is firmly in contact with the profiles at the sides of the tires. This contact pressure is such that, in the case of a driven wheel, the tires can entrain the teeth or cams and hence the further parts of each caterpillar track.

On the outer surface that is remote from the wheels 104 and 105, each belt 145 is provided with a large number of transverse ridges 147 covering its whole width. Each ridge 147 is preferably located directly opposite a tooth or cam 146 on the other side of the belt 145. Each ridge 147 is provided at a distance from the belt 145 with a supporting part 148 having a flat outer surface, which comes into contact with the ground and which has essentially the shape of a parallelepiped. The supporting part 148 of each ridge 147 is connected by a tie part 149 with the belt 145. As seen in FIG. 17, each tie piece 149 is narrower than the corresponding supporting part 148 and terminates in the supporting part 148 through a cavity 150. The cavity 150 covers the whole width of each transverse ridge 147. The cavity 150 is orientated to the front with respect to the direction of rotation of track 144 (direction B in FIG. 17) so that the ridge 147 forms a scoop-like member on that side. On the side of the tie piece 149 located opposite the cavity 150, a further cavity is provided in this embodiment as a mirror image of the cavity 150. This rear cavity, in the direction B, provides, in the disposition shown, an increased flexibility of the supporting part 148 with respect to the belt 145 and said cavity has the same function as the cavity 150 when track 144 is applied to the wheels in a reversed position or when the tractor travels rearwardly. FIG. 18 shows that the belt 145 is provided with a liner comprising a large number of coplanar, parallel steel wires 151 extending parallel to the direction of length of track 144, said wires being endless on a circular path. These steel wires 151 are interconnected by a large number of steel wires 152 extending parallel to one another in the direction of width of track 144. The steel wires 152 are preferably fastened to the steel wires 151 crossing the same at right angles so that a network is formed. Instead of using steel wires, strong synthetic plastics or other fibers may be employed. The network of steel wires 151 and 152 is embedded in the material of the belt 145. The belt 145, the teeth or cams 146 and the transverse ridges 147 are integral and made from a single piece of flexible material, for example, a synthetic resin or a rubber-like material.

During operation, the tractor engine 119 drives only the axles 113 of the hindmost rearwheels 105 through the auxiliary shaft 118, the variable torque converter 117 and the differential 116. With a direction of rotation of the rearwheels 105 corresponding with the direction A, the driving moment of each wheel axle 113 is transmitted through a wheel disc 153 (FIG. 18) to a wheel flange 154 holding wheel rims 155 of the tires 106. Upon rotation, the tires 106 carry along the teeth or cams 146 located between them so that each track 144 is rotated. The foremost rear wheels 104 are driven solely by tracks 144. The tractive run of each track 144 is located on the ground and is vigorously drawn rearwardly by the driving moment of the hindmost rear wheel 105 (direction B) so that parts of track 144 deform as is shown in FIG. 17. The reaction force exerted by the ground on the supporting parts 148 curves the belt 145 so that the supporting parts 148 tilt to some extent and the cavities 150 grip into the ground, thus providing a very high resistance to slipping and skidding.

It has been found that the grip of the tires 106 on the sandwiched cams 146, when the tractive part of each track 144 is in contact with the ground, is appreciably higher than in the case in which the tractive part of track 144 is not in contact with the ground. This is the case, for example, when the rear wheels 105 are driven so that the tractor travels in reverse. This increased clamping of the teeth or cams 146 between the tyres 106 depends upon the resistance experienced by the tractive part of track 144 on the ground, which resistance is appreciably influenced by the aforesaid tilting movement of the supporting parts 148. A similar endless tread track structure may also be used when, on either side of the tractor, only two wheels are provided one behind the other. In this case the teeth or cams are arranged in two parallel rows so that a tyre fits between the rows of cams with clamping force.

The assembly of the two pairs of rear wheels 104 and 105, track 144 and the adjacent supporting beam 114 is coupled by a shaft 156 with the similar assembly on the other side of the tractor. The center line of the shaft 156 is formed by the axis of the shaft 156 is held by means of supports on the bottoms of the frame beams 102. Near the front of the two supporting beams 114, upwardly extending hydraulic cylinders 157 are provided for actuation from the driver seat. The top of each hydraulic cylinder 157 is pivoted to the tractor frame 101, whereas the bottom of each cylinder is pivoted to the top of a supporting beam 114. By simultaneous actuation of the hydraulic cylinders 157, the two aforesaid assemblies can be turned about the pivotal shaft 115 and can be fixed in chosen ones of a plurality of angular positions, which is important when the tractor is steered by the front wheels 103 through a bend, in which case the contact surface with the ground is reduced. By moving the fronts of the supporting beams 114 downwardly, the wheel base, measured in the direction of length of the tractor, can be materially reduced whereas, at an upward movement of the front ends of the supporting beams 114, said wheel base is enlarged. During normal operation, the cylinders 157 cannot be energized so that the assemblies of wheels and tracks 144 can freely match the ground. Since the shaft 156 is journalled on the frame beams 102 at a place located closer to the axles 113 of the hindmost rear wheels than to the axles 112 of the foremost rear wheels, the pressure on the driven rear wheels is higher than the pressure on the rear wheels 104 which are not directly driven. This is important for the tilting movement of the ridges 147 of tracks 144.

The wheel discs 153 are fastened by bushings 158 welded to the wheel flanges 154 (FIG. 18). Each bushing 158 has an uninterrupted hole for receiving one of four bolts 159 by which each wheel disc 153 can be fastened to the associated wheel flange 154. Each wheel disc 153 has a square shape (FIG. 17) so that, after release of the four bolts 159, the wheel flange 154 together with the bushings 158, after a small turn about the wheel axle, can be removed in an outward direction. The wheel flange 154, together with the corresponding tires 106 can be inverted so that the bushings 158 can be mounted on the outer side of the wheel disc 153 whereby wheels 105 extend farther outwardly relative to the frame of the tractor. Also by removing the wheels 105 (or wheels 104) the tracks can be installed or removed.

The steps described above are not limited to use with tractors. They may also be carried out on vehicles subjected to analogous conditions, for example, motorvans, trucks, soil cultivating machines, tool carriers and the like.

I claim:

1. A vehicle included in the group which comprises tractors, motorcars, soil cultivating machines, trucks, wagons and the like, wherein the vehicle comprises a frame and ground engaging wheels mounted on said frame, a track arranged around at least two of said ground engaging wheels, said track comprising a continuous belt of flexible material, said belt being provided with profiles which include first parts connected substantially rigidly to said belt and extending substantially parallel to adjacent surface of said belt at its circumference and second parallel parts spaced at a distance therefrom, said first and second parts rigidly connected by central web parts extending substantially normally to the adjacent portion of said belt, each of said profiles having a cross-section which is an I-shaped configuration.

2. A vehicle according to claim 1 wherein each said profile is composed of metal covered by a layer of a flexible material.

3. A vehicle according to claim 1 wherein each said profile extends across the entire transverse width of the belt.

4. A vehicle according to claim 3 wherein each said profile is connected to said belt by two rows of bolts through said first parts, the center lines of said bolts being parallel to said web parts and on either side thereof.

5. A vehicle according to claim 4 comprising strip means adapted to receive said wheels and to retain said track around said wheels, said rows of bolts connecting a said strip means to said belt opposite each said profile whereby said belt is compressed between each opposed said profile and said strip means.

6. A vehicle according to claim 5 wherein the width of each said profile across said track is substantially equal to the same width of each corresponding said strip means.

7. A vehicle according to claim 5 wherein the length of each said profile parallel to said track is substantially equal to the same length of each corresponding said strip means.

8. A vehicle according to claim 5 wherein the distance between the outermost surface of said second part of each said profile and its corresponding said strip means where received by said bolts is substantially equal to the distance between succeeding profiles along and parallel to said track.

9. A vehicle included in the group which comprises tractors, motorcars, soil cultivating machines, trucks, wagons, and the like, wherein the vehicle comprises a frame and ground engaging wheels mounted on said frame, a track arranged around at least two of said ground engaging wheels, wherein one is forward of the other, said track comprising a continuous belt of flexible material, said belt being provided with profiles which include first leg parts extending substantially parallel to said belt at the respective adjacent circumference of said belt and second and third leg parts for ground engaging spaced at a distance therefrom, two web parts connecting said first leg part with said second and third leg parts and extending substantially normally to said belt, said first leg part being connected to said belt and said second and third leg parts aligned to engage the same strip of ground, the outer ends of said third leg part being functionally unimpeded by said parts of other said profiles and extending to the rear relative to the vehicle's direction of forward travel when in contact with the underlying surface.

10. A vehicle according to claim 9 wherein each said profile extends the entire transverse width of said belt.

11. A vehicle according to claim 10 wherein each said profile is connected to said belt by two rows of bolts through said first leg parts, the center lines of said bolts being parallel to the corresponding said two web parts and extending between such corresponding said two leg parts.

12. A vehicle according to claim 11 comprising strip means adapted to receive said wheels and to retain said track around said wheels, said rows of bolts connecting a said strip means to said belt opposite each said first leg part whereby said belt is compressed between each opposed said strip means and said first leg part.

13. A vehicle according to claim 12 wherein the length of each said first leg part parallel to said track is approximately equal to or slightly greater than the length of its corresponding said strip means.

14. A vehicle according to claim 12 wherein the width of each said profile across said track is substantially equal to the same width of each corresponding said strip means.

* * * * *